United States Patent
Ebeling et al.

(10) Patent No.: US 6,871,379 B2
(45) Date of Patent: Mar. 29, 2005

(54) METHOD AND APPARATUS FOR APPLIANCE INSTALLATION AND LEVELING

(75) Inventors: Christopher D. Ebeling, Verona, WI (US); Brian D. Wylie, Verona, WI (US)

(73) Assignee: Wolf Appliance Company, LLC, Fitchburg, WI (US)

(*) Notice: Subject to any disclaimer, the term of this patent is extended or adjusted under 35 U.S.C. 154(b) by 14 days.

(21) Appl. No.: 10/261,808

(22) Filed: Oct. 1, 2002

(65) Prior Publication Data

US 2004/0060148 A1 Apr. 1, 2004

(51) Int. Cl.$^7$ .............................................. B60B 33/04
(52) U.S. Cl. ................................................ 16/19; 16/32
(58) Field of Search .......................... 16/19, 18 R, 32; 254/126, DIG. 8, 123, 122; 280/43.2, 43.17; 248/188.4, 188.2

(56) References Cited

U.S. PATENT DOCUMENTS

| | | | |
|---|---|---|---|
| 103,782 A | | 5/1870 | Sargent |
| 1,429,383 A | | 9/1922 | Warner |
| 1,835,144 A | | 12/1931 | Cleaveland |
| 1,882,464 A | | 10/1932 | White |
| 2,467,657 A | * | 4/1949 | Brown ........................ 254/122 |
| 2,508,934 A | * | 5/1950 | Berg .......................... 254/122 |
| 2,803,510 A | | 8/1957 | Carbary |
| 2,853,732 A | | 9/1958 | Matter |
| 2,879,075 A | | 3/1959 | Wallace |
| 3,040,391 A | | 6/1962 | Saunders |
| 3,186,670 A | | 6/1965 | Perl |
| 3,347,523 A | * | 10/1967 | Hankey et al. ............. 254/122 |
| 3,386,208 A | | 6/1968 | Banner |
| 3,432,878 A | | 3/1969 | Hupfer |
| 3,534,430 A | | 10/1970 | Kesling, et al. |
| 3,670,357 A | | 6/1972 | Steigerwald |
| 3,716,890 A | | 2/1973 | Benson |
| 3,750,989 A | | 8/1973 | Bergeson |
| 3,844,578 A | | 10/1974 | Matyskella, et al. |
| 3,858,270 A | | 1/1975 | Crowe |
| 3,968,949 A | | 7/1976 | Romano, Jr. |
| 3,997,143 A | * | 12/1976 | Rose .......................... 254/425 |
| 4,669,580 A | * | 6/1987 | Neville ....................... 188/1.12 |
| 4,748,715 A | | 6/1988 | Rice |
| 4,783,879 A | | 11/1988 | Weaver |
| 4,789,121 A | | 12/1988 | Gidseg et al. |
| 4,932,729 A | | 6/1990 | Thompson et al. |
| 4,955,569 A | | 9/1990 | Hottmann |
| 5,347,680 A | | 9/1994 | Rippe |
| 5,481,769 A | * | 1/1996 | Schneider ...................... 5/617 |
| 5,749,550 A | | 5/1998 | Jackson |
| 5,865,424 A | * | 2/1999 | Lutz et al. .................. 254/126 |
| 5,950,990 A | * | 9/1999 | Castillo ....................... 254/126 |
| 5,971,408 A | * | 10/1999 | Mandel et al. ............. 280/43.2 |
| 6,375,161 B2 | * | 4/2002 | Garceau ....................... 254/126 |
| 6,409,291 B1 | | 6/2002 | Johnson |
| 6,594,951 B1 | * | 7/2003 | Reynolds ...................... 47/39 |
| 6,601,806 B2 | * | 8/2003 | Wing et al. ............. 248/188.2 |
| 6,644,626 B2 | * | 11/2003 | Baril .......................... 254/2 R |
| 6,755,433 B2 | * | 6/2004 | Krauss ....................... 280/456.1 |

FOREIGN PATENT DOCUMENTS

GB      2206859 A    *   1/1999

* cited by examiner

*Primary Examiner*—Suzanne Dino Barrett
*Assistant Examiner*—Mark Williams
(74) *Attorney, Agent, or Firm*—Foley & Lardner LLP

(57) ABSTRACT

A method and apparatus for appliance installation and leveling using a leveling caster. The leveling caster includes a top shelf connected to wheels by a scissors type structure. The height of the scissors type structure can be adjusted using an adjustment bolt from the front of the appliance, without requiring access to the rear of the appliance. The leveling caster is adjustable over a wide range of heights, is strong enough to bear heavy appliances, and allows height adjustment while minimizing incidental horizontal motion.

12 Claims, 10 Drawing Sheets

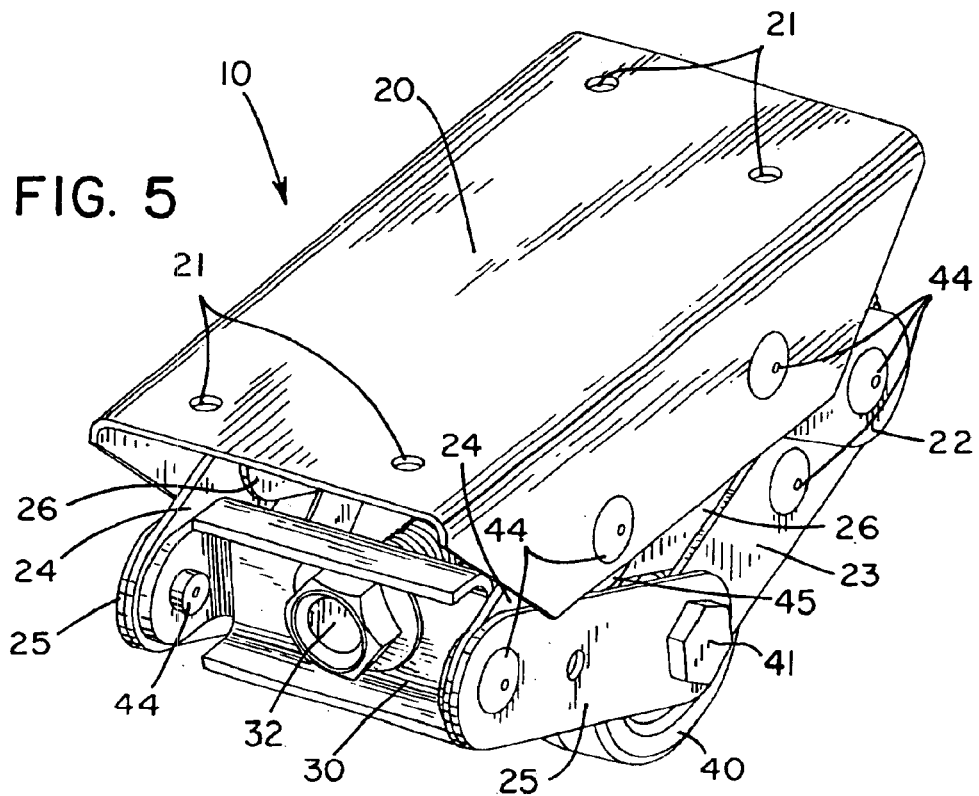
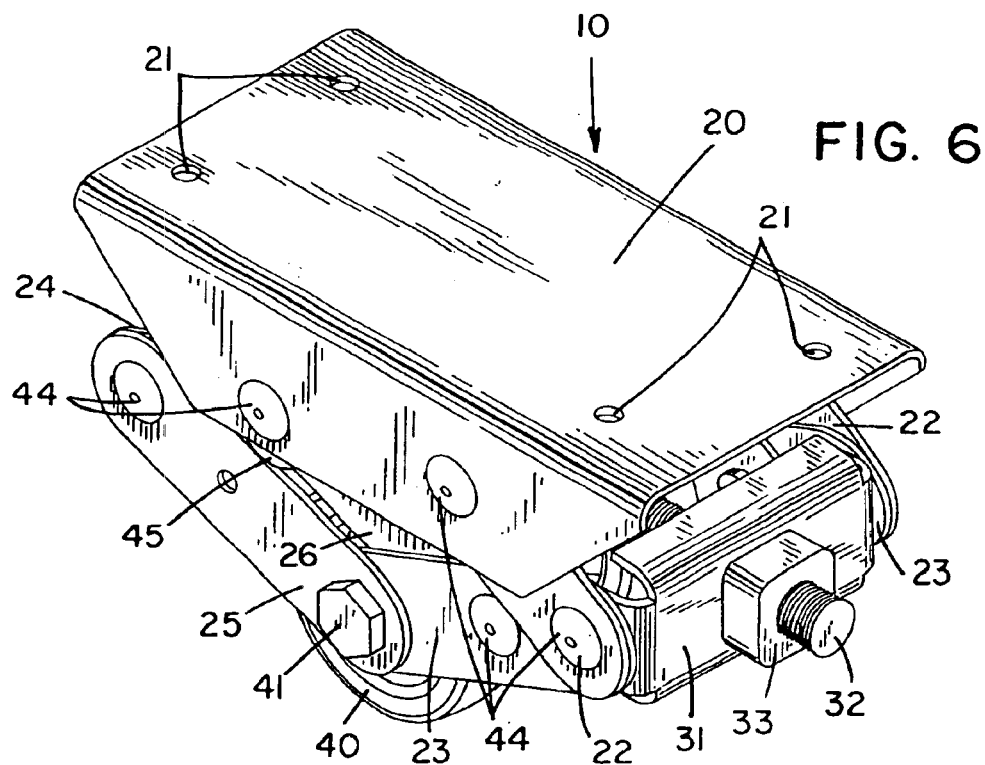

METHOD AND APPARATUS FOR APPLIANCE INSTALLATION AND LEVELING

FIELD OF THE INVENTION

The present invention relates generally to the field of appliances, and particularly to installation and leveling of appliances.

BACKGROUND OF THE INVENTION

Household and commercial appliances, for example stoves, ranges, dishwashers, refrigerators, clothes washers and dryers, and other appliances, require careful installation so that they operate properly and fit correctly into their surrounding environment. Three important measures of the installation of an appliance are the degree to which the appliance is level, the height of the appliance, and the ease of moving the appliance, for example during installation, maintenance, or cleaning.

The performance of many appliances can be diminished if they are not level during operation. For example, an oven that is not level will often bake cakes that are also not level. If the burners or other cooking surfaces of a stove are not level, foods such as eggs in a frying pan may pool on one side and cook unevenly. Refrigerators may have systems, such as cooling or ice making systems, which function best when they are level. Clothes washers may become unbalanced more easily when they are not installed level. For this reason, devices for leveling appliances are known in the art.

The height of an appliance is also often important. It may be advantageous to adjust the height of an appliance to match its surrounding cabinetry or countertop. A cook may wish to adjust the height of an appliance for comfort during use, or for other reasons. Even small differences in height or level of an appliance can create a perception of low quality or defective construction, of both the appliance and its surroundings. For these reasons, devices to adjust the height of an appliance are known in the art.

Appliances are often heavy and awkwardly shaped. It may be difficult to maneuver appliances during installation, especially into limited or confined spaces. It may also be necessary to move appliances to allow maintenance and cleaning of the appliances themselves and the areas around the appliances. For these reasons, it is common to place wheels on appliances.

It may be necessary or desirable to level an appliance, or adjust the height of an appliance, after the appliance has been placed in its final position, especially when the appliance is not easily movable. Even a movable appliance, e.g. one with wheels, may be most conveniently leveled or fitted into place after it is moved into its final horizontal position, to exactly match the countertops and surrounding cabinetry. Adjustment of the height or level of the rear of an appliance can be difficult, however, because access to the rear of an appliance may be very limited, for example in the case of a refrigerator or stove fitted into a space between surrounding countertops. For these reasons, devices to adjust the height of the rear of an appliance from the front are known in the art.

SUMMARY OF THE INVENTION

The present invention relates to a method and apparatus which allows the height and level of an appliance to be adjusted from the front of the appliance without requiring access to the rear of the appliance. The method and apparatus according to the invention incorporates a shelf supported on wheels by a scissors-type structure. By turning a forward-facing adjustment bolt in one direction, the scissors-type structure extends to increase the height of the shelf above the wheels. By turning the forward-facing adjustment bolt in the other direction, the scissors-type structure compresses under the weight of the appliance to decrease the height of the shelf above the wheels.

The method and apparatus according to the invention includes a scissors-type structure which allows vertical adjustment of height and level across a wide range of heights while minimizing horizontal movement incidental to the vertical adjustment. The method and apparatus is strong enough to accommodate even heavy appliances such as commercial stoves and refrigerators. The method and apparatus includes wheels to allow the appliance to be moved into and out of its final installed position without requiring access to the rear of the appliance.

Further objects, features, and advantages of the invention will be apparent from the following detailed description when taken in conjunction with the following drawings.

BRIEF DESCRIPTION OF THE DRAWINGS

In the drawings:

FIG. 5 is a front perspective view of a preferred embodiment of a leveling caster according to the invention.

FIG. 6 is a rear perspective view of a preferred embodiment of a leveling caster according to the invention.

DETAILED DESCRIPTION OF THE INVENTION

Figure 1:
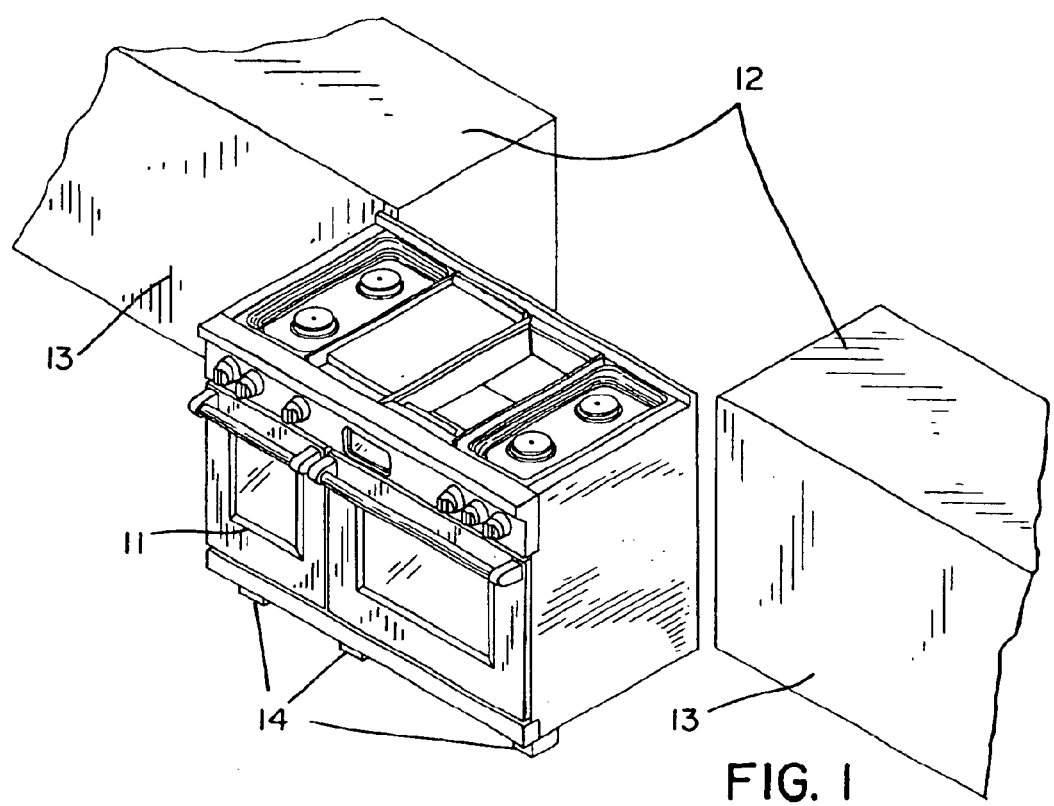
FIG. 1 is a perspective view of an appliance being installed between surrounding countertops and cabinetry.

With reference to the drawings, FIG. 1 shows a perspective view of an appliance, indicated generally at 11, prior to installation between surrounding countertops, indicated generally at 12, and cabinetry, indicated generally at 13. The appliance 11 preferably includes at least one front support leg, indicated generally at 14. The rear support for the appliance 11 is hidden in the perspective view of FIG. 1.

Figure 2:
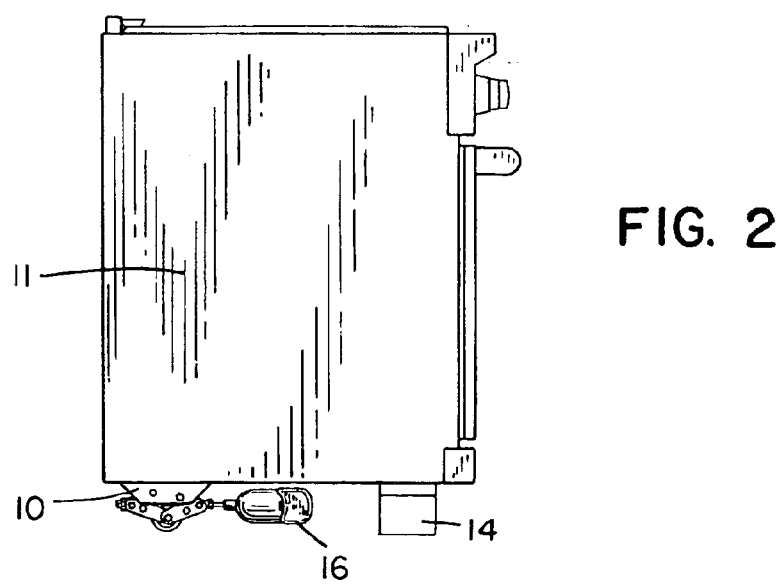
FIG. 2 is a side view of an appliance including a preferred embodiment of a leveling caster according to the invention.

FIG. 2 provides a side view of an appliance 11, which shows a preferred embodiment of a leveling caster according to the invention, indicated generally at 10, located at the rear of the appliance 11. As best shown in the front view of an appliance 11 found in FIG. 3, and in the bottom view of an appliance 11 found in FIG. 4, the appliance may include multiple leveling casters 10 and multiple front support legs 14.

As shown in FIGS. 5 and 6, a leveling caster 10 according to the invention includes an adjustment bolt 32 passing through a front adjustment bolt bracket 30 and a rear adjustment bolt bracket 31, and which may be used to adjust the height of the leveling caster 10.

Figure 3:
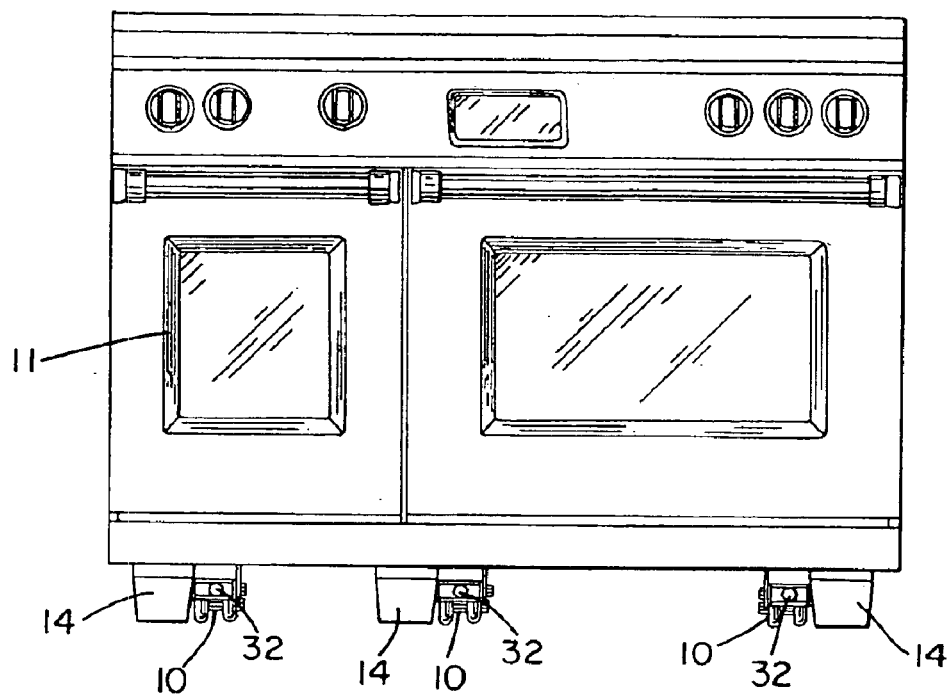
FIG. 3 is a front view of an appliance including a preferred embodiment of a leveling caster according to the invention.
Figure 4:
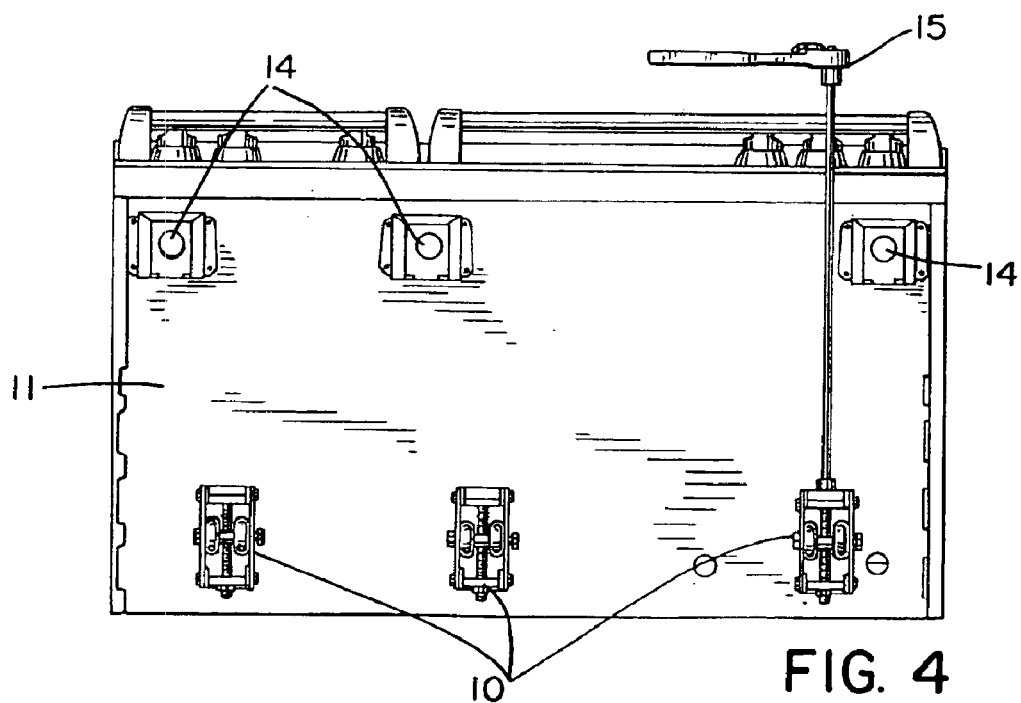
FIG. 4 is a bottom view of an appliance including a preferred embodiment of a leveling caster according to the invention.

As best shown in FIGS. 3 and 4, the leveling casters 10 are preferably offset horizontally from the front support legs 14, so that the front support legs 14 do not obstruct access from the front of the appliance 11 to the adjustment bolts 32 on the leveling casters 10. This allows the height of the leveling casters 10 to be adjusted from the front of the appliance 11, preferably using a socket wrench 15, without requiring access to the rear of the appliance 11. As best shown in FIG. 2, the minimum height of the leveling caster 10 (when fully compressed) is preferably chosen to allow a power tool, for example a socket wrench 15 attached to a cordless power drill 16, to fit underneath the appliance to allow easy and rapid adjustment of the height of the leveling caster, although this is not required.

Figure 9:
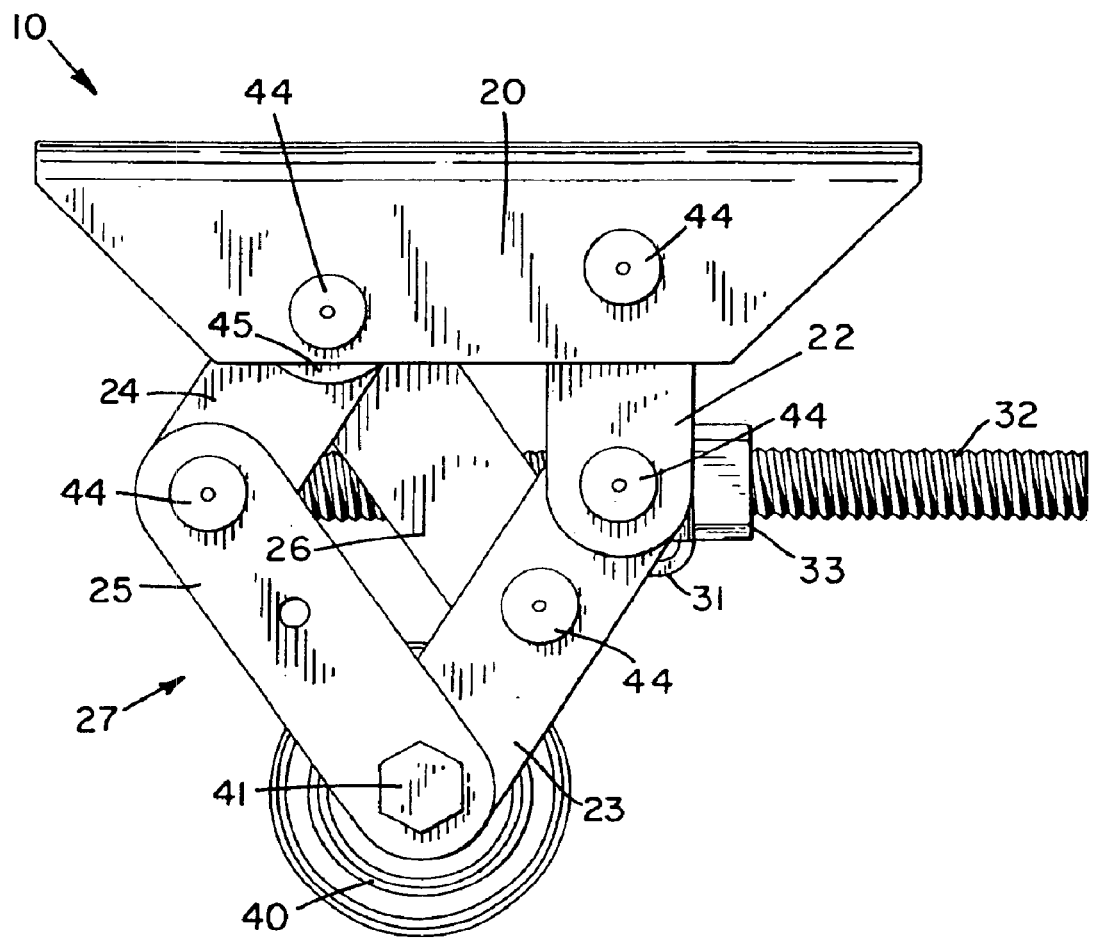
FIG. 9 is a right side view of a preferred embodiment of a leveling caster according to the invention, where the height of the leveling caster has been increased.
Figure 10:
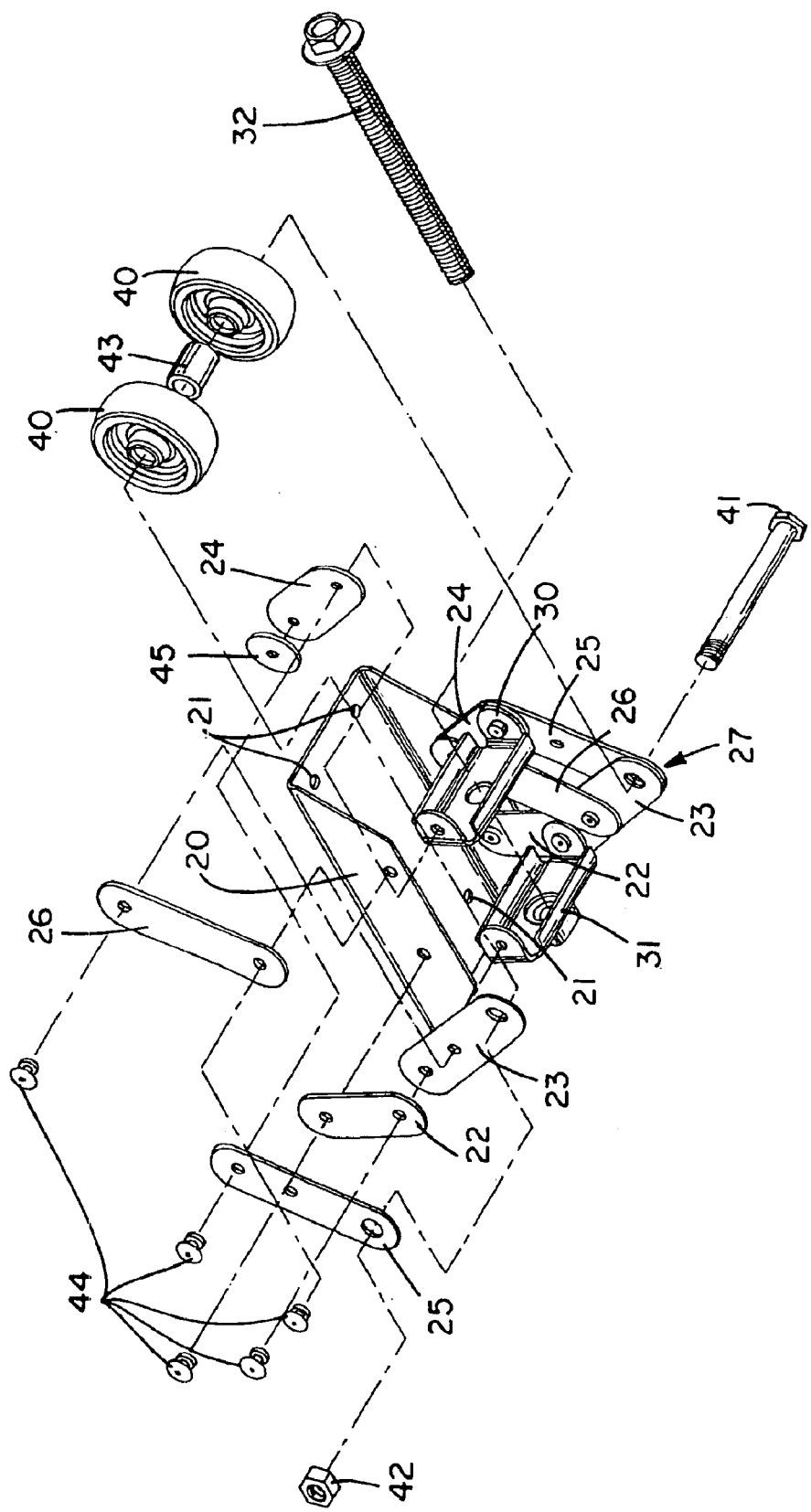
FIG. 10 is an exploded perspective view of a preferred embodiment of a leveling caster according to the invention.
Figure 11:
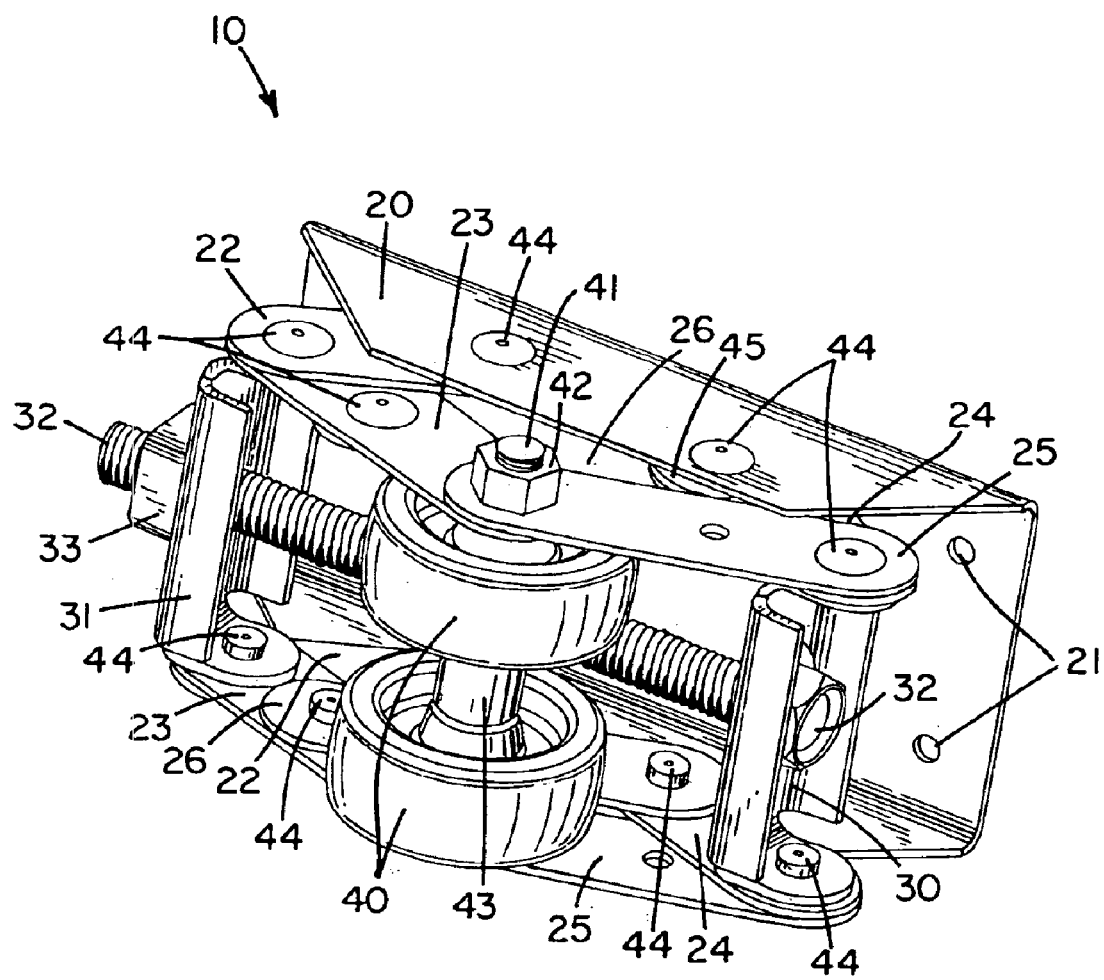
FIG. 11 is a perspective view from a point below a preferred embodiment of a leveling caster according to the invention.

The construction of a preferred embodiment of a leveling caster 10 according to the invention is perhaps best illustrated in FIGS. 9, 10, and 11. In the side view of FIG. 9, the height of the leveling caster 10 has been increased, thereby revealing the internal construction of the leveling caster 10. FIG. 10 provides an exploded perspective view which further illustrates the construction of a preferred embodiment of a leveling caster according to the invention. FIG. 11 provides a perspective view of the underside of the leveling caster 10, further illustrating the mechanism used to adjust the height of the leveling caster 10.

As best shown in FIGS. 10 and 11, a preferred embodiment of a leveling caster 10 according to the invention has two wheels 40 which may be separated by an axle spacer 43. The two wheels 40 and the axle spacer 43 are preferably mounted on an axle 41 and secured on the axle, for example using an axle nut 42.

Figure 13:
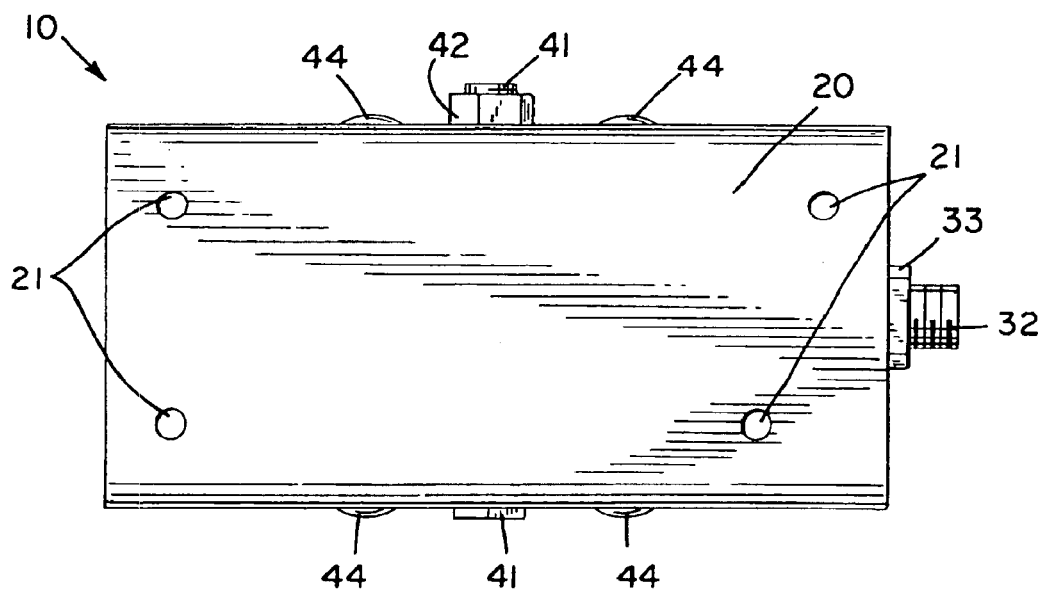
FIG. 13 is a top view of a preferred embodiment of a leveling caster according to the invention.

As best shown in FIGS. 9 and 10, a preferred embodiment of a leveling caster 10 according to the invention has a top shelf 20, preferably made of sheet metal and one or more wheels 40 mounted on an axle 41. As best shown in FIGS. 5 and 13, the top shelf 20 may have one or more mounting holes 21 which can be used to secure the leveling caster 10 to the frame of an appliance 11, for example using screws, rivets, or nuts and bolts. The top shelf 20 is connected to the axle 41 by a scissors-type support structure, indicated generally at 27, whose height may be adjusted, thereby allowing the overall height of the leveling caster 10 to be adjusted.

As best shown in FIG. 11, a preferred embodiment of a leveling caster 10 according to the invention has a front adjustment bolt bracket 30, a rear adjustment bolt bracket 31, an adjustment bolt 32, and an adjustment nut 33. The adjustment bolt 32 passes through a hole in the front adjustment bolt bracket 30 and through a hole in the rear adjustment bolt bracket 31 where it is threaded through an adjustment nut 33. The adjustment nut 33 may be permanently attached to the rear adjustment bolt bracket 31, for example by welding.

By tightening the adjustment bolt 32 in the adjustment nut 33, the front adjustment bolt bracket 30 is drawn toward the rear adjustment bolt bracket 31, extending the scissors-type support structure 27 and increasing the height of the leveling caster 10. Similarly, by loosening the adjustment bolt 32 in the adjustment nut 33, the weight of the appliance 11 compresses the scissors-type support structure 27, forcing the front adjustment bolt bracket 30 and the rear adjustment bolt bracket 31 apart and reducing the height of the leveling caster 10.

Figure 7:
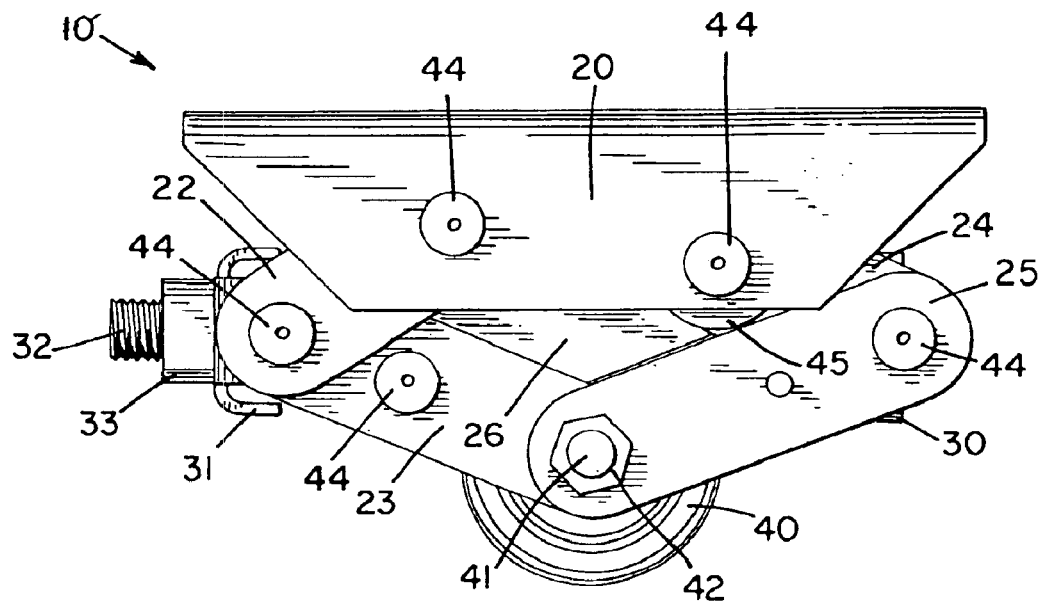
FIG. 7 is a left side view of a preferred embodiment of a leveling caster according to the invention.
Figure 8:
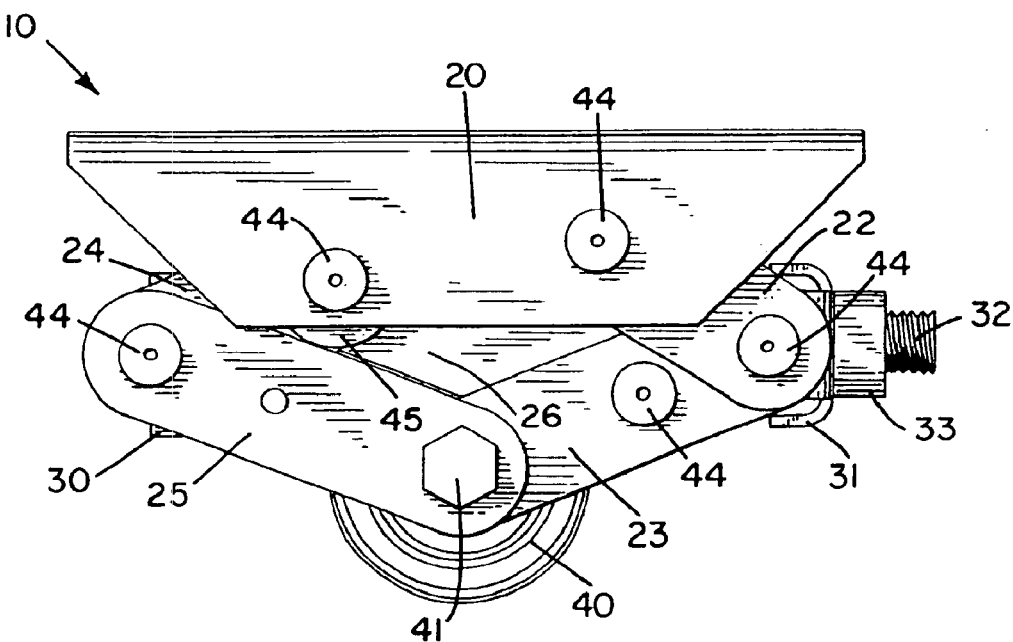
FIG. 8 is a right side view of a preferred embodiment of a leveling caster according to the invention.

As illustrated by the left side view found in FIG. 7 and the right side view found in FIG. 8, the construction of the scissors-type support structure 27 which connects the top shelf 20 to the axle 41 is essentially the same on the left and right sides of the leveling caster 10, so the following description applies to both the right and left sides.

As best shown in FIGS. 9 and 10, the scissors-type support structure 27 of a preferred embodiment of a leveling caster 10 according to the invention has an upper rear support arm 22, a lower rear support arm 23, an upper front support arm 24, a lower front support arm 25 and an inside support arm 26. Each of these five support arms is preferably formed of sheet metal and elongated, with an upper end, a lower end, and a middle section, although they may differ in length.

The lower end of the lower rear support arm 23 and the lower end of the lower front support arm 25 are pivotably connected together and to the axle 41, for example by passing the axle 41 through a hole in the lower end of the lower rear support arm 23 and also through a hole in the lower end of the lower front support arm 25.

The upper end of the lower rear support arm 23 is pivotably connected to the lower end of the upper rear support arm 22 and to the rear adjustment bolt bracket 31, for example using a pivoting rivet 44. The upper end of the upper rear support arm 22 is pivotably connected to the top shelf 20, for example using a pivoting rivet 44. The lower end of the inside support arm 26 is pivotably connected to a point in the middle section of the lower rear support arm 23, for example using a pivoting rivet 44.

The upper end of the lower front support arm 25 is pivotably connected to the lower end of the upper front support arm 24 and to the front adjustment bolt bracket 30, for example using a pivoting rivet 44. The upper end of the upper front support arm 24 and the upper end of the inside support arm 26 are pivotably connected to each other and to the top shelf 20, for example using a pivoting rivet 44 and a washer 45.

Figure 12:
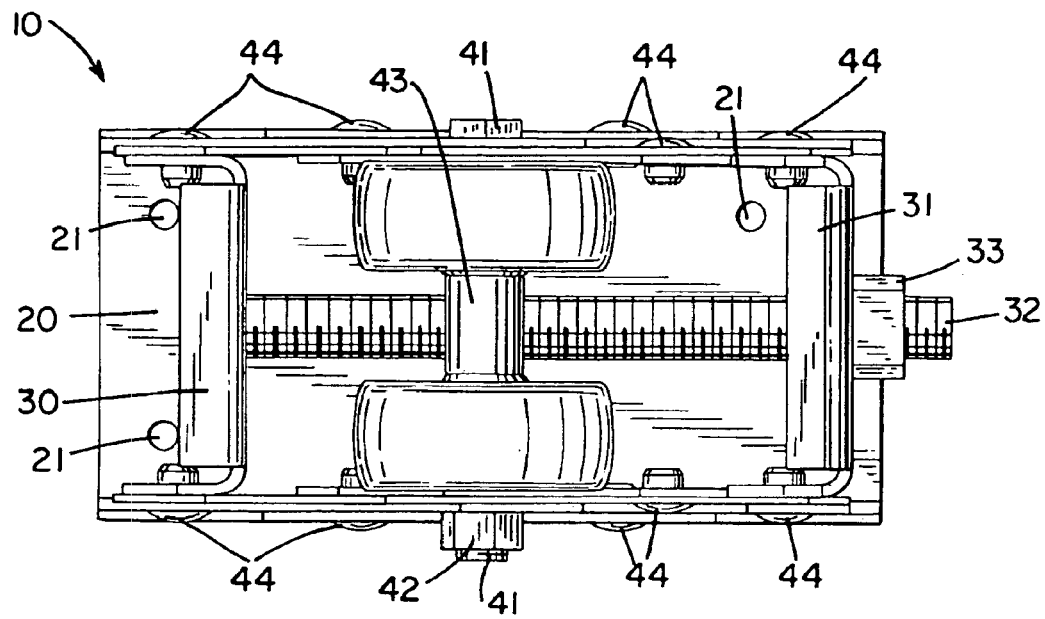
FIG. 12 is a bottom view of a preferred embodiment of a leveling caster according to the invention.
Figure 14:
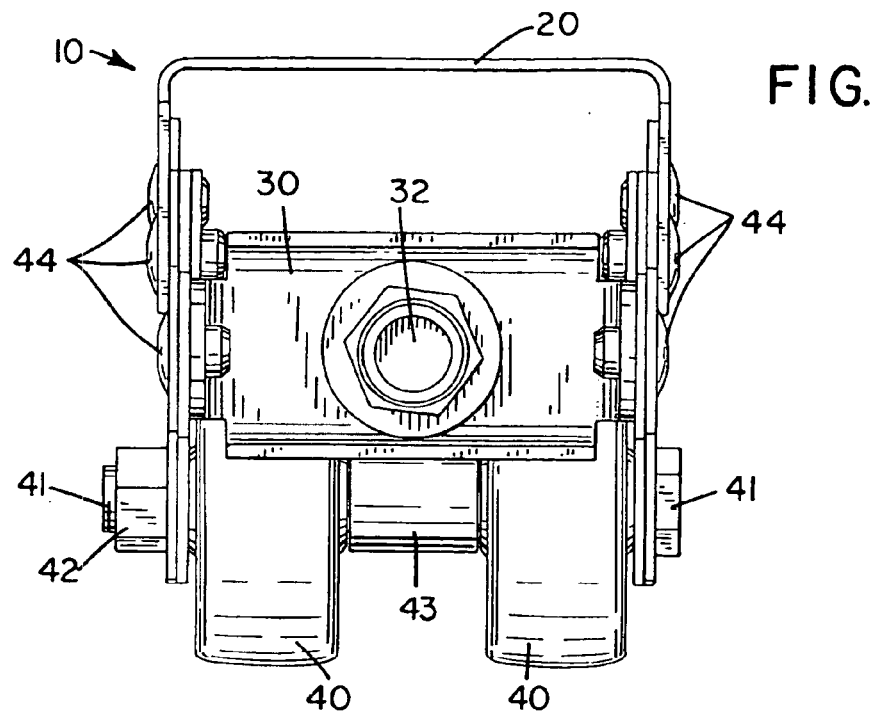
FIG. 14 is a front view of a preferred embodiment of a leveling caster according to the invention.
Figure 15:
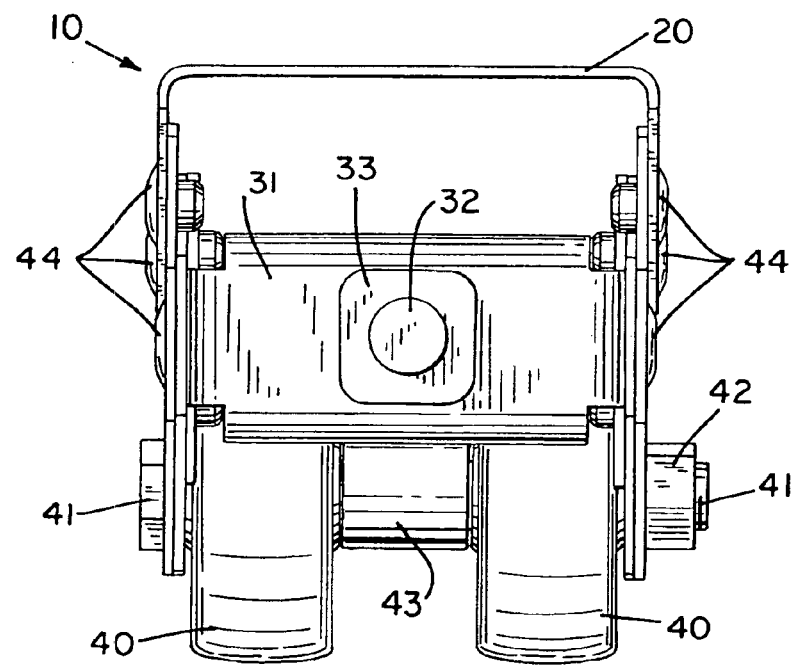
FIG. 15 is a rear view of a preferred embodiment of a leveling caster according to the invention.

FIGS. 12–15 provide additional illustration of the construction of a preferred embodiment of a leveling caster 10 according to the invention. FIG. 12 shows the details of the underside of the leveling caster 10. FIG. 13 shows the details of the top side of the leveling caster 10. FIG. 14 shows the details of the front of the leveling caster 10. FIG. 15 shows the details of the rear of the leveling caster 10.

As best shown in FIGS. 2, 3, and 4, an appliance 11 may include one or more front support legs 14 which provide support for at least a portion of the appliance. For example, the appliance 11 shown in FIGS. 3 and 4 uses three leveling casters 10 to support the rear of the appliance 11, and three front support legs 14 to support the front of the appliance. The front support legs 14 may be of any conventional construction. The front support legs 14 may be adjustable in height, or of fixed height. The front support legs 14 may be avoided entirely by using leveling casters 10 exclusively to support the appliance 11.

Figure 16:
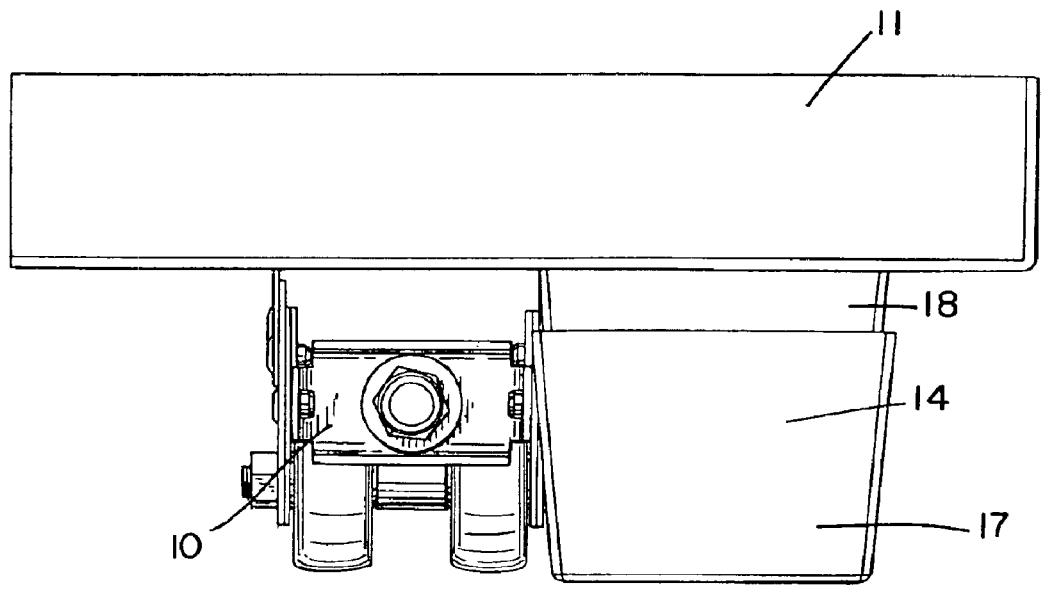
FIG. 16 is a front view of an embodiment of a front leg for an appliance.
Figure 17:
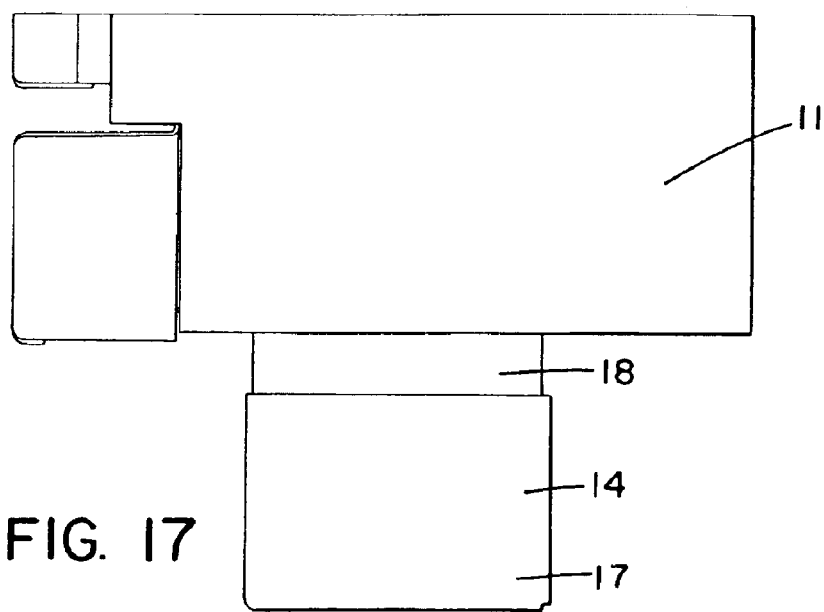
FIG. 17 is a side view of an embodiment of a front leg for an appliance.

As shown in FIGS. 16 and 17, in a preferred embodiment the front support legs 14 have an upper section 18 which nests inside a lower section 17, and an adjustment mechanism (not shown) which is used to adjust the height of the front support legs 14.

There are various possibilities with regard to alternative embodiments and applications of a leveling caster according to the invention.

Although the leveling caster may be used at the rear of an appliance, it may also be used at the front of an appliance, instead of or in addition to the front support legs 14, by replacing one or more of the support legs 14 with one or more leveling casters 10.

Instead of using a horizontal offset to avoid obstructing the leveling casters 10, a hole could be placed in the front support leg or the adjustment bolt 32 could be mounted at an angle. Alternatively, a tool which provides a built-in offset could be used instead of a tool with a straight shaft.

Although an ordinary machine bolt is used as the adjustment bolt 32 in a preferred embodiment, other types of structures, for example, one or more flat head screws, phillips head screws, alien head screws, or ratchets may be used instead of or in addition to the adjustment bolt 32 to cause the scissors-type support structure to extend or compress. Other types of tools, for example a screwdriver or alien wrench could be used instead of a socket wrench 15 or power drill 16. To resist unwanted changes in height or level caused by vibration or other reasons, the degree of compression or extension of the scissors-type support structure could be lockable after adjustment, for example by using an aircraft-type nut, a lock nut, or a lock washer instead of or in addition to the adjustment nut 33, or by using a wedge, pin, or other structure to lock the position of the adjustment mechanism.

Although two wheels 40 and an axle spacer 43 mounted on an axle 41 and secured with an axle nut 42 are used in a preferred embodiment, other types of rollable structures could be used. For example, there could be a greater or lesser number of wheels, or some combination of the wheels 40, axle spacer 43, and axle 41 may be combined into a single piece, for example a molded roller. Instead of an axle nut, other means for securing the wheels and axle could be used, for example a lock washer, a cotter pin, a molded or heat-formed structure, or a structure or material held on by friction or adhesion, for example molded plastic or rubber, or glue. One or ore of the wheels could be lockable to prevent rolling after installation, for example using a pin inserted through a slotted nut or a friction-based brake assembly.

Although a top shelf 20 is used in a preferred embodiment, other structures could be used. For example, the top shelf could be eliminated by mounting the scissors-type structure directly to the frame of the appliance 11. Alternatively, the top shelf could be formed in different shapes or in multiple pieces.

Similarly, different scissors-type support structures may be used instead of the particular scissors-type support structure of the preferred embodiment. There may be a greater or lesser number of support arms, for example the inside support arm shown in the preferred embodiment could be eliminated. The support arms may have different shapes than those shown in the preferred embodiment. There may be only one scissors-type support structure, or more than two pairs of scissors-type support structures, instead of the two pairs of scissors-type support structures found in the preferred embodiment (one pair on each side).

It is understood that the invention is not confined to the embodiments set forth herein as illustrative, but embraces all such forms thereof as come within the scope of the following claims.

What is claimed is:

1. An apparatus for adjusting the height of an appliance comprising:
    (a) a top shelf;
    (b) at least one wheel having an axle;
    (c) a front adjustment bracket having a hole;
    (d) a rear adjustment bracket having a nut;
    (e) an adjustment bolt passing through the hole in the front adjustment bracket and threaded into the nut of the rear adjustment bracket;
    (f) an upper front support arm having an upper end and a lower end, with the upper end of the upper front support arm pivotably connected to the top shelf;
    (g) a lower front support arm having an upper end and a lower end, with the upper end of the lower front support arm pivotably connected to the lower end of the upper front support arm and to the front adjustment bracket;
    (h) an upper rear support arm having an upper end and a lower end, with the upper end of the upper rear support arm pivotably connected to the top shelf; and
    (i) a lower rear support arm having an upper end and a lower end, with the upper end of the lower rear support arm pivotably connected to the lower end of the upper rear support arm and to the rear adjustment bracket and with the lower end of the lower rear support arm pivotably connected to the axle and to the lower end of the lower front support arm;
    whereby turning the adjustment bolt alters the distance between the top shelf and the axle.

2. The apparatus of claim 1 wherein the adjustment bolt extends horizontally.

3. The apparatus of claim 1 wherein the at least one wheel comprises at least two wheels.

4. The apparatus of claim 1 wherein at least one wheel is lockable.

5. The apparatus of claim 1 wherein the adjustment bolt is lockable.

6. The apparatus of claim 1 wherein the angle between the lower end of the lower rear support arm and the lower end of the lower front support arm may be locked.

7. An apparatus for adjusting the height of an appliance comprising:
    (a) a top shelf;
    (b) at least one wheel having an axle;
    (c) a front adjustment bracket having a hole;
    (d) a rear adjustment bracket having a nut;
    (e) an adjustment bolt passing through the hole in the front adjustment bracket and threaded into the nut of the rear adjustment bracket;
    (f) an upper front support arm having an upper end and a lower end;
    (g) an inside support arm having an upper end and a lower end, with the upper end of the inside support arm pivotably connected to the top shelf and to the upper end of the upper front support arm;

(h) a lower front support arm having an upper end and a lower end, with the upper end of the lower front support arm pivotably connected to the lower end of the upper front support arm and to the front adjustment bracket;

(i) an upper rear support arm having an upper end and a lower end, with the upper end of the upper rear support arm pivotably connected to the top shelf; and (j) a lower rear support arm having an upper end, a middle section, and a lower end, with the upper end of the lower rear support arm pivotably connected to the lower end of the upper rear support arm and to the rear adjustment bracket and with the middle section of the lower rear support arm pivotably connected to the lower end of the inside support arm and with the lower end of the lower rear support arm pivotably connected to the axle and to the lower end of the lower front support arm;

whereby turning the adjustment bolt alters the distance between the top shelf and the axle.

8. The apparatus of claim 7 wherein the adjustment bolt extends horizontally.

9. The apparatus of claim 7 wherein the at least one wheel comprises at least two wheels.

10. The apparatus of claim 7 wherein at least one wheel is lockable.

11. The apparatus of claim 7 wherein the adjustment bolt is lockable.

12. The apparatus of claim 7 wherein the angle between lower end of the lower rear support arm and the lower end of the lower front support arm may be locked.

* * * * *